2,951,008

SOLUBILIZED METAL SALTS OF N-NITROSO N-ARYLHYDROXYL-AMINES

George J. Leitner, Iselin, N.J., assignor to Heyden Newport Chemical Corporation, New York, N.Y., a corporation of Delaware No Drawing. Filed Sept. 11, 1957, Ser. No. 683,212

3 Claims. (Cl. 167—30)

This invention relates to fungicidal and fungistatic compositions and to methods of making the same. More particularly it relates to methods of solubilizing oil insoluble salts of N-nitroso N-arylhydroxylamines and compositions containing the same so that they are readily soluble in Stoddard solvent, mineral spirits and other commonly employed volatile organic solvents, particularly those used in commerce. The end product compounds of this invention, and more particularly compositions containing the copper salts of N-nitroso N-arylhydroxylamines and N-nitroso N-mono-substituted phenylhydroxylamines, possess outstanding fungicidal and bactericidal properties when applied to textile materials, cellulosic materials, protective coatings, plastics and agricultural products, growing or harvested.

The copper salt of N-nitroso N-phenylhydroxylamine, more commonly known as "Copper Cupferron," has been known to be an effective fungicide with many desirable properties. Because of its insolubility, the use of "Copper Cupferron" as a preservative and bactericide was long restricted to coarse dispersions in both water and non-aqueous solvents. Under such conditions the effectiveness of its application was limited by non-penetration, lack of uniformity on the treated articles, aand susceptibility to removal by mechanical abrasion or by the washing action of water.

In my copending application Serial No. 606,975, filed August 30, 1956 and in my copending application Serial No. 648,767, filed March 27, 1957, I disclosed different methods of effecting the oil solubility of N-nitroso N-arylhydroxylamine salts and the novel end products thereof. I have now conceived another and different method and end product for accomplishing this result which method and end product have certain definite advantages over the methods and products of my said prior applications.

I have now discovered that it is possible to solubilize oil insoluble salts of N-nitroso N-arylhydroxylamines with certain commonly available organic amines. However, when such organic amines are used alone, they produce limited solubility of the resulting compositions, they impart to the treated product extreme basicity and objectionable odor and render it extremely difficult to formulate water repellent compositions.

My further experiments and tests in connection with this problem evolved the fact that the use of such organic amines with one or more oil soluble metallic carboxylic acid soaps overcame the objections to the use of the organic amines, per se, reduced the cost of the solubilizing agents, reduced or eliminated the undesirable high pH and reduced or eliminated the amine odors. Furthermore, the concentrations of the solubilized metal salts obtained are very high, at least 15–30% by weight.

The present invention therefore comprises the employment of certain organic amines in combination with oil soluble metal carboxylic acid soaps which serve as adjuncts to such amines in the solubilizing operation.

Organic amines which have been found to be effective in this solubilization are compounds containing at least three carbon atoms and as many as thirty-six carbon atoms. They may be primary, secondary or tertiary amines. They may be diamines or substituted diamines. The organic portion of the molecule may be aliphatic, aromatic, or cyclic in character. The amine molecule may possess an oxygen molecule in the form of an ether or hydroxy group. That is to say, the amine is not otherwise substituted than with a hydrocarbon radical, hydroxy radical and an ether radical.

Specific examples of the amines that are functional are as follows:

2-methyl-2-amino-1-propanol
diisopropanolamine
o-phenylendiamine
diethylamine
N-hydroxyethyl morpholine
aminoethyl ethanolamine
tributylamine
didodecyl methylamine
octadecenyl amine
dioctadecyl amine
dibutylamine 2-ethylhexylamine
cocoamine
triethanolamine
N-dodecyl propylene diamine
propylene diamine
isopropylamine
aniline
dimethyl aniline
morpholine
3-aminopropyl morpholine
3-methoxypropylamine The metal soaps which are used as adjunct solubilization agents in the present invention may be soaps of any metal or mixture of metals which form soaps with soap-forming acids or mixtures of such acids. Copper, zinc and nickel are the preferred soaps. However, tin, magnesium, aluminum and alkali earth metals are also usable in this invention.

In the preferred embodiment of my invention I use saturated and unsaturated soap forming acids having from 8 to 18 carbon atoms. These include oleic, ricinoleic, linoleic, linolenic, stearic, palmitic, myristic, lauric, 2-ethylhexoic, isooctoic and naphthenic acids. The soap forming acids derived from tall oil, rosin oil, rosin, soybean oil and tallow oils may also be used.

In carrying out the process of the present invention the reactants or solubilizing agents should be heated to a temperature of 75° F. to approximately 300° F. or the decomposition point of the mixture, with good agitation. Solutions containing high percentages of the oil insoluble metal salts of N-nitroso N-arylhydroxylamine, and in particular of "Copper Cupferron," can be attained by this process.

By the use of the aforementioned water insoluble oil soluble metal soaps in combination with an amine or amines, I have made possible the solubilization of oil insoluble metal salts of N-nitroso N-arylhydroxyl amines represented by the formula

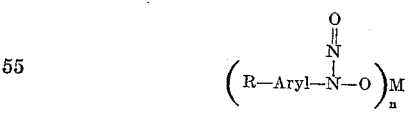

wherein R represents 0 or more substituents on the aryl ring, examples of which are alkyl, halogen, aryl, aralkyl, alkoxy, aldehydo, carboxylic, sulfonic, alkenyl, alkylol, hydroxyl and amino groups. Specific examples of these groups are:

Methyl
Ethyl
Tertiaryamyl
Butyl
Octyl
Chloro
Fluoro
Bromo
Iodo
Phenyl

Naphthyl
Methylphenyl
Phenethyl
Isobutylphenyl
Hydroxy
Methoxy
Ethoxy
Phenoxy
p-toluene sulfonic acid
Dimethyl amino M represents a cation capable of forming a water insoluble complex salt with an N-nitroso N-arylhydroxyl amine and wherein $n$ represents a valence of metal M. Examples of such cations are:

| | |
|---|---|
| Copper | Aluminum |
| Tin | Cobalt |
| Zinc | Magnesium |
| Calcium | Mercury |
| Barium | Sodium |
| Zirconium | Potassium |
| Iron | Cadmium |

The following examples set forth specific embodiments of the invention but are not to be construed as limiting the same. In the examples, "part" refers to part by weight.

EXAMPLE 1

15 parts of the copper salt of N-nitroso N-3-chlorophenylhydroxylamine were dissolved in a mixture of 35 parts of copper naphthenate, 15 parts of laurylamine and 35 parts of mineral spirits with agitation and heating at 145° F. for 15 minutes.

A homogeneous solution containing 15% solubilized copper N-nitroso N-3-chlorophenylhydroxylamine was obtained. This concentrate was readily dilutable in mineral spirits, toluene, kerosene and turpentine.

EXAMPLE 2

Example 1 was repeated using 15 parts of the zinc salt of N-nitroso N-phenylhydroxylamine as the active agent.

EXAMPLE 3

By heating at 145° F. for 20 minutes, 20 parts of the copper salt of N-nitroso N-phenylhydroxylamine were dissolved in a mixture of 45 parts of nickel oleate, 10 parts of diethanolamine and 25 parts of toluol. The homogeneous solution was soluble in pine oil, terpentine and fuel oil.

EXAMPLE 4

16 parts of the iron salt of N-nitroso N-phenylhydroxylamine were dissolved in a mixture of 30 parts of magnesium octoate 8 parts of morpholine and 46 parts of hi-flash naphtha by heating at 180° F. for 10 minutes.

This concentrate was a clear solution upon dilution of 1 part with 10 parts of mineral spirits.

EXAMPLE 5

After heating at 120° F. for 50 minutes, 23 parts of the copper salt of N-nitroso N-phenylhydroxylamine were dissolved in 20 parts of copper naphthenate, 25 parts of zinc octoate, 17 parts of N-octadecyl propylene diamine, and 36 parts of benzene.

The resultant product was readily soluble in pine oil, mineral spirits, terpentine and kerosene.

EXAMPLE 6

8 parts of the aluminum salt of N-nitroso N-phenylhydroxylamine and 5 parts of the zirconium salt of N-nitroso N-phenylhydroxylamine were solubilized in 60 parts zinc naphthenate, 13 parts of morpholine and 32 parts of hi-flash naphtha upon heating at 160° F. for 10 minutes.

This material was readily dilutable in benzene, toluene and turpentine.

EXAMPLE 7

30 parts of the calcium salt of N-nitroso-p-nonyl n-phenylhydroxylamine were solubilized in 40 parts of sodium naphthenate, 20 parts of aluminum stearate and 10 parts of isopropyl amine by agitating for 45 minutes at 160° F. An amber viscous homogeneous solution results. This material was soluble in benzene and toluene.

EXAMPLE 8

10 parts of the manganese salt of N-nitroso-alpha-N-naphthylhydroxylamine and 5 parts of the potassium salt of N-nitroso-N-phenylhydroxylamine were dissolved in 30 parts of potassium oleate, 25 parts of zinc octoate and 6 parts of triethanolamine by heating at 120° F. for 20 minutes. The resulting product was soluble in pine oil, fuel oil and kerosene.

EXAMPLE 9

20 parts of the zinc salt of N-nitroso-p-methoxy-n-phenylhydroxylamine were solubilized in 65 parts of zinc naphthenate, 18 parts of disoya amine and 20 parts toluene by agitation at room temperature for 35 minutes. The dark amber homogeneous concentrate was readily dilutable in mineral spirits, hi-flash naphtha and kerosene.

EXAMPLE 10

12 parts of cobalt salt and 3 parts of the mercury salt of N-nitroso-N-phenylhydroxylamine were rendered soluble by adding these salts to a solution containing 70 parts of nickel naphthenate, 4 parts of morpholine and 18 parts of toluol at 145° F. The resultant deep red solution was readily soluble in most common organic solvents.

EXAMPLE 11

25 parts of the sodium salt of N-nitroso-m-dimethylamino-N-phenylhydroxylamine were dissolved in 20 parts of sodium naphthenate, 40 parts of zinc tallate, 10 parts laurylamine and 40 parts of dimethyl formamide. The homogeneous product was readily dilutable in most organic solvents.

EXAMPLE 12

10 parts of barium N-nitroso o-hydroxyl N-phenylhydroxylamine were dissolved in 8 parts morpholine, 20 parts of nickel octoate and 25 parts of pine oil. A deep green homogeneous solution results.

EXAMPLE 13

15 parts of copper N-nitroso-N-phenylhydroxylamine were dissolved in a mixture of 35 parts of zinc naphthenate, 30 parts of dehydroabietyl amine and 30 parts of mineral spirits by heating at 170–180° F. for 20 minutes. The resultant concentrate was readily soluble in most common organic solvents.

EXAMPLE 14

5 parts of cadmium N-nitroso N-phenylhydroxylamine and 5 parts of zinc N-nitroso n-orthotoloylhydroxylamine were dissolved in 10 parts of 3-methoxy propyl amine and 35 parts of zinc naphthenate by agitation at 135° F. for 30 minutes. The resulting viscous composition was soluble in most organic solvents.

EXAMPLE 15

18 parts of copper N-nitroso-N-phenylhydroxylamine were dissolved in a mixture of 10 parts of morpholine, 50 parts of nickel octoate and 20 parts of hi-flash naphtha by agitating at 160–170° F. for 10 minutes. This product diluted readily with mineral spirits, other naphthas and fuel oil.

Varying mineral spirit dilutions of this concentrate were used to treat 8 ounce cotton duck and compared fungicidally to samples similarly treated with a solubilized copper 8-quinolinolate. The basis for this comparison was the soil burial test, a test which is representative of the most severe conditions to which a fungicidally treated fabric can be subjected. The soil used in this test contained numerous fungi and bacteria which normally cause very rapid deterioration of cellulosic material.

The tests were conducted with both leached and unleached samples. The leaching procedure was as follows: The specimen was cut to a dimension which, when placed in a two quart jar containing water, allowed all surfaces of the specimen to have free access to the water. A continuous flow of water was applied to the bottom of the jar at a rate of about 8 liters per hour for a period of 24 hours. At the end of the leaching period, the specimen was removed from the water and air dried.

In the soil burial chamber the specimens of fabric were placed horizontally on a 4 inch bed of soil, spaced at least one inch from any other specimen and covered with one inch of loam soil. After the exposure period of 2, 4 and 6 weeks, the specimens were removed, washed, air dried and placed in a constant temperature room for 24 hours at 76° F. and 50% relative humidity. The resistance to mildew deterioration was determined by the change in the tensile strength of the material compared with the tensile strength of the original untreated fabric. The results are recorded in the following table, wherein an oil soluble copper 8-quinolinolate is used as a comparator.

Having thus fully described the invention, what I claim as new and desire to secure by Letters Patent is:

1. A composition comprising: a normally oil insoluble metal salt of N-nitroso N-arylhydroxylamine of the metals selected from the group which consists of copper and zinc in homogeneous solution in a vehicle consisting essentially of a mixture of at least one oil soluble metal carboxylic acid soap having 8–18 carbon atoms, at least one amine selected from the group which consists of 2-methyl-2-amino-1-propanol, disopropanolamine, o-phenylendiamine, diethylamine, N-hydroxyethyl morpholine, aminoethyl ethanolamine, tributylamine, didodecyl methylamine, octadecenyl amine, dioctadecyl amine, dibutylamine, 2-ethylhexylamine, cocoamine, triethanolamine, N-dodecyl propylene diamine, propylene diamine, isopropylamine, aniline, dimethyl aniline, morpholine, 3-aminopropyl morpholine, and 3-methoxypropylamine, and a solvent selected from the group which consists of

*Table I*

SOIL BURIAL TEST

| Compound | Percent Cu Dep. | Percent Retained Tensile Strength ||||||
|---|---|---|---|---|---|---|---|
| | | 2 Weeks || 4 Weeks || 6 Weeks ||
| | | Unlchd. | Lchd. | Unlchd. | Lchd. | Unlchd. | Lchd. |
| Fabric control | | 0 | 0 | 0 | 0 | 0 | 0 |
| Copper Cupferron | 0.05 | 83 | 7 | 41 | 0 | 0 | 0 |
| | 0.10 | 100+ | 99 | 100+ | 98 | 39 | 44 |
| | 0.20 | 100+ | 100+ | 100+ | 100+ | 83 | 98 |
| | 0.30 | 98 | 100 | 100+ | 100+ | 92 | 94 |
| Copper 8-Quinolinolate | 0.05 | 77 | 91 | 28 | 34 | 14 | 15 |
| | 0.10 | 100 | 92 | 46 | 35 | 27 | 18 |
| | 0.20 | 96 | 98 | 100 | 88 | 91 | 99 |

The foregoing examples are illustrative of the method of this invention employing the raw materials to which I have referred. In these various examples, I have not attempted to indicate the steps by which the several metal soaps are produced as these metal soaps are common commercially available soaps of the metals and acids to which reference has been made.

The present invention has many advantages over prior disclosures. For example, the solubilizing agents employed are readily available commercially at relatively low cost and as a result do not necessitate the synthesis of special solubilizing agents in separate reactions. The process may be economically and efficiently carried out with conventional apparatus and in relatively short periods of time without any special precautions.

The present invention thus provides highly practical methods of obtaining the results which I desire to accomplish in a most economical manner.

The foregoing detailed description sets forth the invention in its preferred practical forms, but the invention is to be understood as fully commensurate with the appended claims.

mineral spirits, high flash naphtha, kerosene, fuel oil, pine oil, benzene, toluene, xylene, turpentine, and said oil soluble metal salt ranging in concentration of 10–30% by weight of the composition.

2. A composition according to claim 1, wherein the acid of the metal soap is selected from the group which consists of oleic, rincinoleic, linoleic, linolenic, stearic, palmitic, myristic, lauric, 2-ethylhexoic, isooctoic, naphthenic acids, tall oil acids, soya fatty acids, rosin oil, rosin, and tallow oil acids.

3. A composition according to claim 2, wherein the metal of the carboxylic acid soaps are selected from the group which consists of copper, zinc, magnesium, tin, aluminum, sodium, potassium and nickel.

References Cited in the file of this patent

UNITED STATES PATENTS 2,635,978    Massengale            Apr. 21, 1953
2,745,832    Faith et al.             May 15, 1956

OTHER REFERENCES

Chem. Abst., vol 19, p. 1232, 1925.
Chem. Abst., vol. 21, p. 3791, 1927.